United States Patent
Zhou

(10) Patent No.: US 11,893,775 B2
(45) Date of Patent: *Feb. 6, 2024

(54) NAVIGATING A VEHICLE BASED ON DATA PROCESSING USING SYNTHETICALLY GENERATED IMAGES

(71) Applicant: PlusAI, Inc., Santa Clara, CA (US)

(72) Inventor: Mianwei Zhou, Santa Clara, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,373

(22) Filed: Feb. 27, 2023

(65) Prior Publication Data
US 2023/0360371 A1   Nov. 9, 2023

Related U.S. Application Data

(63) Continuation of application No. 17/735,812, filed on May 3, 2022, now Pat. No. 11,594,016.

(51) Int. Cl.
*G06V 10/774* (2022.01)
*G06T 11/00* (2006.01)
(Continued)

(52) U.S. Cl.
CPC ......... *G06V 10/774* (2022.01); *B60W 60/001* (2020.02); *G06T 11/001* (2013.01);
(Continued)

(58) Field of Classification Search
CPC .... G06V 10/774; G06V 10/776; G06V 10/82; G06V 20/588; B60W 60/001;
(Continued)

(56) References Cited

U.S. PATENT DOCUMENTS 10,460,208 B1 * 10/2019 Atsmon ................. G06V 20/64
11,080,876 B2 * 8/2021 Islam ......................... G06T 7/55
(Continued)

FOREIGN PATENT DOCUMENTS

CN   104981377 A  * 10/2015   ............... G06K 9/00
CN   104981377 A     10/2015
(Continued)

OTHER PUBLICATIONS

Wang, Sheng-Yu, et al., "Sketch Your Own GAN", Proceedings of the IEEE/CVF International Conference on Computer Vision, 2021, doi.org/10.48550/arXiv.2108.02774, 11 pages.

*Primary Examiner* — Babar Sarwar
(74) *Attorney, Agent, or Firm* — Sheppard Mullin Richter & Hampton LLP

(57) ABSTRACT

A user-generated graphical representation can be sent into a generative network to generate a synthetic image of an area including a road, the user-generated graphical representation including at least three different colors and each color from the at least three different colors representing a feature from a plurality of features. A determination can be made that a discrimination network fails to distinguish between the synthetic image and a sensor detected image. The synthetic image can be sent, in response to determining that the discrimination network fails to distinguish between the synthetic image and the sensor-detected image, into an object detector to generate a non-user-generated graphical representation. An objective function can be determined based on a comparison between the user-generated graphical representation and the non-user-generated graphical representation. A perception model can be trained using the synthetic image in response to determining that the objective function is within a predetermined acceptable range.

20 Claims, 7 Drawing Sheets

(51) Int. Cl.
*G06V 10/82* (2022.01)
*G06V 10/776* (2022.01)
*G06T 11/20* (2006.01)
*B60W 60/00* (2020.01)
*G06V 20/56* (2022.01)

(52) U.S. Cl.
CPC .......... *G06T 11/203* (2013.01); *G06V 10/776* (2022.01); *G06V 10/82* (2022.01); *G06V 20/588* (2022.01); *B60W 2300/145* (2013.01); *B60W 2420/42* (2013.01); *B60W 2530/10* (2013.01); *B60W 2552/53* (2020.02)

(58) Field of Classification Search
CPC ....... B60W 2300/145; B60W 2420/42; B60W 2530/10; B60W 2552/53; G06T 11/001; G06T 11/203
See application file for complete search history.

(56) References Cited

U.S. PATENT DOCUMENTS

| | | | |
|---|---|---|---|
| 11,144,749 B1* | 10/2021 | Lo | G08B 13/19669 |
| 11,276,139 B2* | 3/2022 | Rong | G06T 3/0062 |
| 2018/0275658 A1* | 9/2018 | Iandola | G06F 18/2148 |
| 2018/0275667 A1* | 9/2018 | Liu | B60W 50/029 |
| 2019/0375402 A1* | 12/2019 | Shimizu | B60W 10/18 |
| 2020/0307640 A1* | 10/2020 | Tsuji | B60W 10/20 |
| 2022/0215658 A1* | 7/2022 | Li | G06V 20/182 |

FOREIGN PATENT DOCUMENTS

| | | | | |
|---|---|---|---|---|
| CN | 111833340 A | * | 10/2020 | G06F 18/254 |
| CN | 111833340 A | | 10/2020 | |
| WO | 2020071683 A1 | | 4/2020 | |
| WO | WO-2020071683 A1 | * | 4/2020 | B60W 40/02 |

* cited by examiner

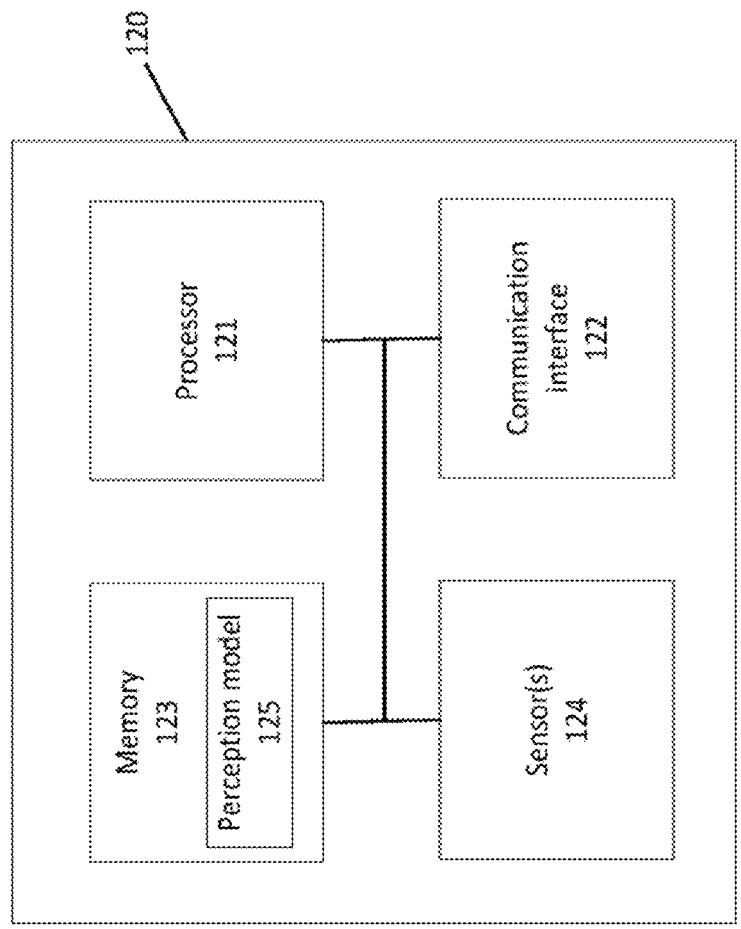

200

Send, via a processor, a user-generated graphical representation into a generative network to generate a synthetic image of an area including a road, the user-generated graphical representation including at least three different colors, each color from the at least three different colors representing a feature from a plurality of features 201

↓

Determine, via the processor, that a discrimination network fails to distinguish between the synthetic image and a sensor detected image 202

↓

Send, via the processor and in response to determining that the discrimination network fails to distinguish between the synthetic image and the sensor-detected image, the synthetic image into an object detector to generate a non-user-generated graphical representation 203

↓

Determine, via the processor, an objective function based on a comparison between the user-generated graphical representation and the non-user-generated graphical representation 204

↓

Train, via the processor, a perception model using the synthetic image in response to determining that the objective function is within a predetermined acceptable range 205

Send, via a processor, a user-generated graphical representation to a generative network to generate a synthetic image, the user-generated graphical representation including a first line having a first color, a first line shape, and a first location, and the synthetic image generated by the generative network based on the first color, the first line shape, and the first location 301

↓

Determine, via the processor, that a discrimination network fails to distinguish between the synthetic image and a sensor-detected image 302

↓

Send, via the processor and in response to determining that the discrimination network fails to distinguish between the synthetic image and the sensor detected image, the synthetic image into an object detector to generate a non-user-generated graphical representation, the non-user-generated graphical representation including a second line having a second color, a second line shape, and a second location 303

↓

Determine, via the processor, at least one objective function based on (1) a first comparison between the first color and to the second color, (2) a second comparison between the first line shape and the second line shape, and (3) a third comparison between the first location and the second location 304

↓

Determine, via the processor and based on the at least one objective function, that the user-generated graphical representation is substantially identical to the non-user-generated graphical representation 305

↓

Update, via the processor and in response to determining that the user-generated graphical representation is substantially identical to the non-user-generated graphical representation, at least one model using the synthetic image 306

Send, via a processor, a user-generated graphical representation into a generative network to generate a synthetic image, the user-generated graphical representation including a first representation of a first object at a first location, the first representation being a first color and a first shape, and the first synthetic image including the first object 401

↓

Determine, via the processor, that a discrimination network fails to distinguish between the synthetic image and a sensor-detected image, the sensor-detected image not including the first object 402

↓

Input, via the processor, the synthetic image into an object detection network to generate a non-user-generated graphical representation, the non-user-generated graphical representation including a second representation of a second object at a second location, and the second representation being a second color and a second shape 403

↓

Determine, via the processor, at least one objective function based on (1) a first comparison between the first location and the second location, (2) a second comparison between the first color and the second color, and (3) a third comparison between the first shape and the second shape 404

↓

Determine, via the processor and based on the at least one objective function, that the user-generated graphical representation is substantially identical to the non-user-generated graphical representation 405

↓

Update, via the processor and in response to determining that the user-generated graphical representation is substantially identical to the non-user-generated graphical representation, a model using the synthetic image 406

FIG. 4

NAVIGATING A VEHICLE BASED ON DATA PROCESSING USING SYNTHETICALLY GENERATED IMAGES

CROSS-REFERENCE TO RELATED APPLICATIONS

This application is a continuation of U.S. patent application Ser. No. 17/735,812, filed on May 3, 2022 and entitled "NAVIGATING A VEHICLE BASED ON DATA PROCESSING USING SYNTHETICALLY GENERATED IMAGES", which is incorporated in its entirety herein by reference.

FIELD

In one or more embodiments, a vehicle (e.g., an autonomous vehicle) is navigated based on data processing using synthetically generated images.

BACKGROUND

Images are sometimes used as training data for software models (e.g., a machine learning model). Images depicting certain scenarios, however, can be expensive and/or challenging to obtain. For example, a vehicle (e.g., an autonomous vehicle) may rely on a machine learning model(s) to perform autonomous driving. In such a scenario, it can be desirable for the machine learning model(s) to be trained/tested using images depicting various scenarios, including scenarios showing atypical scenes. Images depicting some scenarios (e.g., emergency situations, unusual road patterns, animals blocking roads, etc.), however, can be relatively more expensive and/or challenging to obtain compared to images depicting more common scenarios (e.g., non-emergency situations, typical road patterns, etc.). As such, a cost-effective and simple technique to generate images depicting specific scenarios can be desirable.

SUMMARY

In some embodiments, a method includes sending, by a processor, a user-generated graphical representation into a generative network to generate a synthetic image of an area including a road. The user-generated graphical representation can include at least three different colors, and each color from the at least three different colors can represent a feature from a plurality of features. A determination can be made, by the processor, that a discrimination network fails to distinguish between the synthetic image and a sensor detected image. The synthetic image can be sent, by the processor and in response to determining that the discrimination network fails to distinguish between the synthetic image and the sensor-detected image, into an object detector to generate a non-user-generated graphical representation. An objective function can be determined, by the processor, based on a comparison between the user-generated graphical representation and the non-user-generated graphical representation. A perception model can be trained, by the processor, using the synthetic image in response to determining that the objective function is within a predetermined acceptable range.

In some embodiments, an apparatus includes a memory and a processor operatively coupled to the memory. The processor is configured to send a user-generated graphical representation to a generative network to generate a synthetic image. The user-generated graphical representation includes a first line having a first color, a first line shape, and a first location. The synthetic image is generated by the generative network based on the first color, the first line shape, and the first location. The processor is also configured to determine that a discrimination network fails to distinguish between the synthetic image and a sensor-detected image. The processor is also configured to send, in response to determining that the discrimination network fails to distinguish between the synthetic image and the sensor detected image, the synthetic image into an object detector to generate a non-user-generated graphical representation. The non-user-generated graphical representation includes a second line having a second color, a second line shape, and a second location. The processor is also configured to determine at least one objective function based on (1) a first comparison between the first color and to the second color, (2) a second comparison between the first line shape and the second line shape, and (3) a third comparison between the first location and the second location. The processor is also configured to determine, based on the at least one objective function, that the user-generated graphical representation is substantially identical to the non-user-generated graphical representation. The processor is also configured to update, in response to determining that the user-generated graphical representation is substantially identical to the non-user-generated graphical representation, at least one model using the synthetic image.

In some embodiments, a non-transitory processor-readable medium stores code representing instructions to be executed by one or more processors. The instructions include code to cause the one or more processors to send a user-generated graphical representation into a generative network to generate a synthetic image. The user-generated graphical representation includes a first representation of a first object at a first location. The first representation has a first color and a first shape. The first synthetic image includes the first object. The instructions further include code to cause the one or more processors to determine that a discrimination network fails to distinguish between the synthetic image and a sensor-detected image, the sensor-detected image not including the first object. The instructions further include code to cause the one or more processors to input the synthetic image into an object detection network to generate a non-user-generated graphical representation. The non-user-generated graphical representation includes a second representation of a second object at a second location. The second representation is a second color and a second shape. The instructions further include code to cause the one or more processors to determine at least one objective function based on (1) a first comparison between the first location and the second location, (2) a second comparison between the first color and the second color, and (3) a third comparison between the first shape and the second shape. The instructions further include code to cause the one or more processors to determine, based on the at least one objective function, that the user-generated graphical representation is substantially identical to the non-user-generated graphical representation. The instructions further include code to cause the one or more processors to update, in response to determining that the user-generated graphical representation is substantially identical to the non-user-generated graphical representation, a model using the synthetic image

BRIEF DESCRIPTION OF THE DRAWINGS

FIG. 1D shows a block diagram of a vehicle that can be navigated using a perception model, according to an embodiment.

FIG. 2 shows a flowchart of a method for training a perception model using a synthetic image, according to an embodiment.

FIG. 3 shows a flowchart of a method for generating a synthetic image, according to an embodiment.

FIG. 4 shows a flowchart of a method for training a model using a synthetic image, according to an embodiment.

DETAILED DESCRIPTION

Figure 1A:
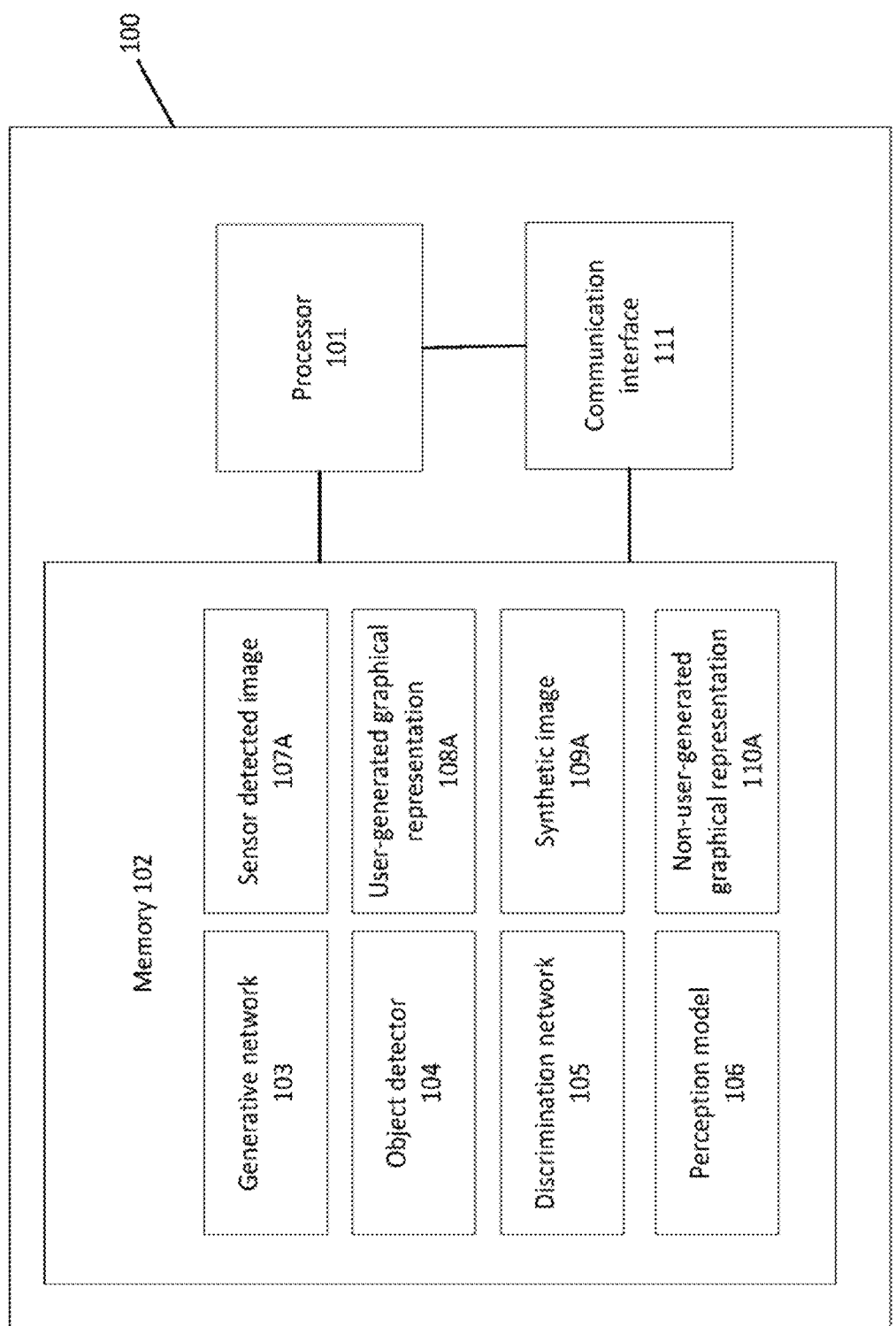
FIG. 1A shows a block diagram of a synthetic image generation system, according to an embodiment.

A generative adversarial network (GAN) can include a generative network and a discrimination network. The generative network generates synthetic images from user-generated graphical representations (e.g., sketches), and the discrimination network tries to distinguish the sensor detected images (i.e., real images) from the synthetic images. Gain of the generative network can be loss of the discrimination network (and vice versa), and as such, incentivize the generative network to generate synthetic images that resemble sensor-detected images (e.g., look realistic from the perspective of a human, look realistic from the perspective of a discrimination network, and/or don't look like a sketch). Furthermore, in response to the discrimination network not being able to distinguish between a real image and an associated synthetic image, the synthetic image can be input into an object detector model (also referred to herein as "object detector"), to generate a non-user-generated graphical representation (e.g., resembling a sketch). An objective function (e.g., loss function or reward function) can be determined based on a difference between the user-generated graphical representation and associated non-user-generated graphical representation, and if the objective function indicates that the user-generated graphical representation is substantially identical to the associated non-user-generated graphical representation (e.g., within a predetermined acceptable range), a model (e.g., perception model of a vehicle) can be updated using the synthetic image generated based on the user-generated graphical representation.

In some implementations, some techniques discussed herein can generate synthetic images showing scenes that may be otherwise difficult to obtain (e.g., by a camera) and/or easier to obtain compared to known methods. For example, rather than waiting for a specific scenario to happen in real-life, and capturing an image of that specific scenario, some techniques discussed herein allow an image partially related to the specific scenario (but not actually depicting that specific scenario) to be used for generating an image depicting that specific scenario based on a user-generated graphical representation (e.g., a picture or diagram made by a user on a computer application or piece of paper). Thus, in some implementations, techniques discussed herein can reduce cost, time, and/or hassle associated with obtaining images depicting specific scenarios compared to known methods.

The synthetic images can also be used to train and/or test a software model, such as a perception model associated with a vehicle. As such, the software model can have an improved quality, accuracy, robustness, range of applications, usefulness, speed, and/or the like. If, for example, the synthetic images are used to train a software model to produce an improved software model that is used, at least partially, to control movements of a vehicle, such an improved software model can cause the vehicle to perform certain maneuvers that may not otherwise have been performed and/or cause the vehicle to refrain from performing certain maneuvers that may otherwise have been performed. As such, the vehicle can operate in a manner that is safer and smarter.

FIG. 1A shows a block diagram of a synthetic image generation system 100, according to an embodiment. The synthetic image generation system 100 can include a memory 102, a processor 101, and a communication interface 111, each communicably coupled to one another (e.g., via a system bus).

The processor 101 can be, for example, a hardware-based integrated circuit (IC) or any other suitable processing device configured to run and/or execute a set of instructions or code. For example, the processor 101 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 101 can be configured to run any of the methods and/or portions of methods discussed herein.

The communication interface 111 can be a hardware component of the synthetic image generation system 100 to facilitate data communication between the synthetic image generation system 100 and external devices (e.g., a network, a compute device, a vehicle, a fleet of vehicles, and/or a server; not shown). The communication interface 111 can be operatively coupled to and used by the processor 101 and/or the memory 102. The communication interface 111 can be, for example, a network interface card (NIC), a Wi-Fi® module, a Bluetooth® module, an optical communication module, and/or any other suitable wired and/or wireless communication interface.

The memory 102 can be, for example, a random-access memory (RAM), a memory buffer, a hard drive, a read-only memory (ROM), an erasable programmable read-only memory (EPROM), and/or the like. The memory 102 can be configured to store any data used by the processor 101 to perform the techniques discussed herein. In some instances, the memory 102 can store, for example, one or more software programs and/or code that can include instructions to cause the processor 101 to perform one or more processes, functions, and/or the like. In some embodiments, the memory 102 can include extendible storage units that can be added and used incrementally. In some implementations, the memory 102 can be a portable memory (for example, a flash drive, a portable hard disk, and/or the like) that can be operatively coupled to the processor 101.

The memory can include a generative network 103, an object detector 104, a discrimination network 105, a perception model 106, a sensor detected image 107A, a user-generated graphical representation 108A, a synthetic image 109A, and a non-user-generated graphical representation 110A. The generative network 103 and discrimination network 105 can be part of a GAN.

Figure 1B:
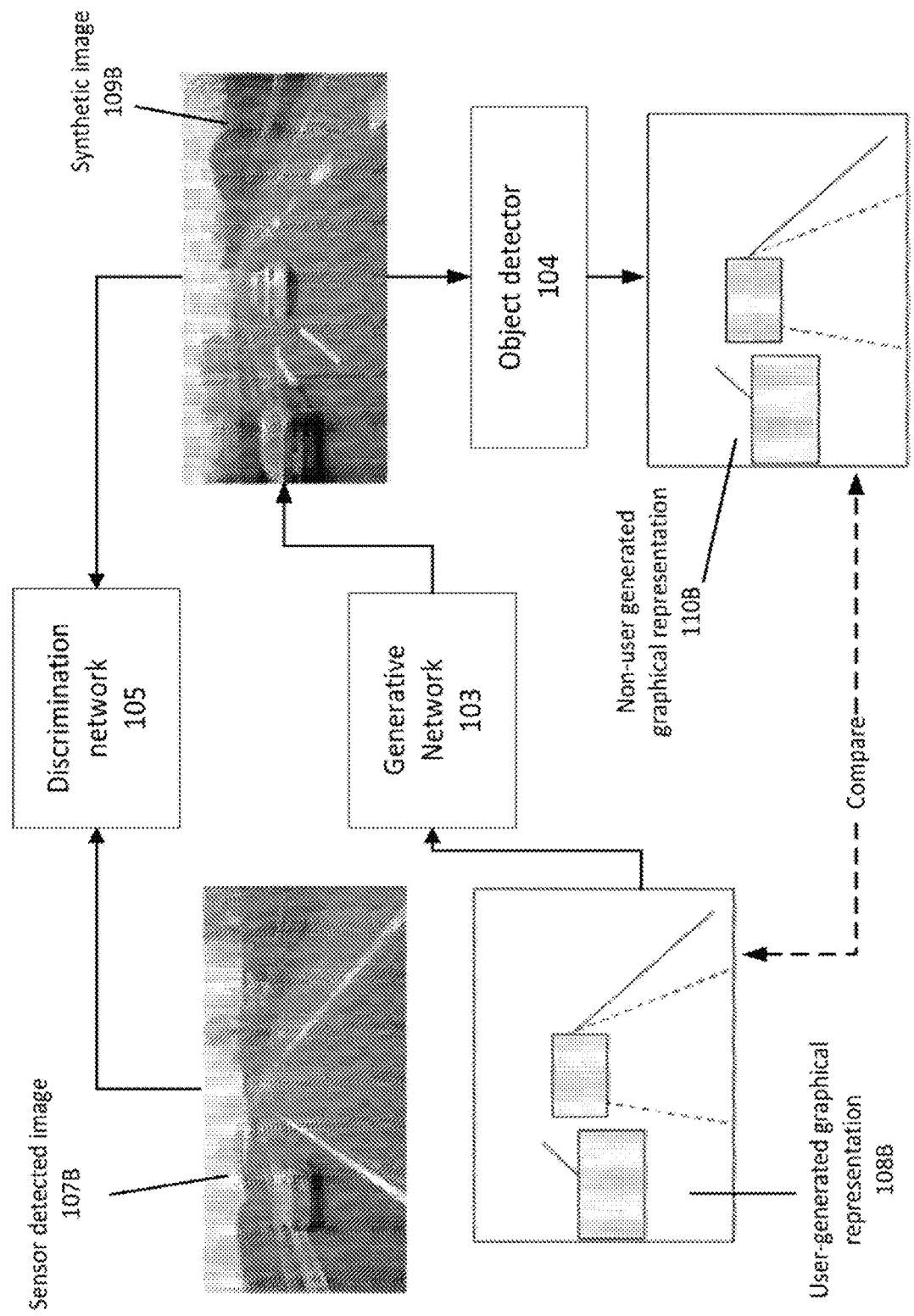
FIG. 1B shows a workflow diagram for using a generative adversarial network (GAN) to generate one or more synthetic images, according to an embodiment.

The sensor detected image(s) 107A can be an image(s) (i.e., real image, photograph, picture) of a real-life scene(s) captured using a sensor(s), such as a camera(s). The sensor detected image 107B shown in FIG. 1B is an example of a sensor detected image 107A. In some implementations, the sensor detected image 107A is of a real area including a road, and includes objects such as road markers, cars, poles, trees, animals, pedestrians, buildings, construction zones, sidewalks, etc. In some implementations, the sensor detected image 107A is captured using an image capturing device included in a vehicle (not shown in FIG. 1A; e.g., autonomous vehicle and/or autonomous semi-truck). In some implementations, the sensor detected image 107A is captured without any direct input from a human.

Figure 1C:
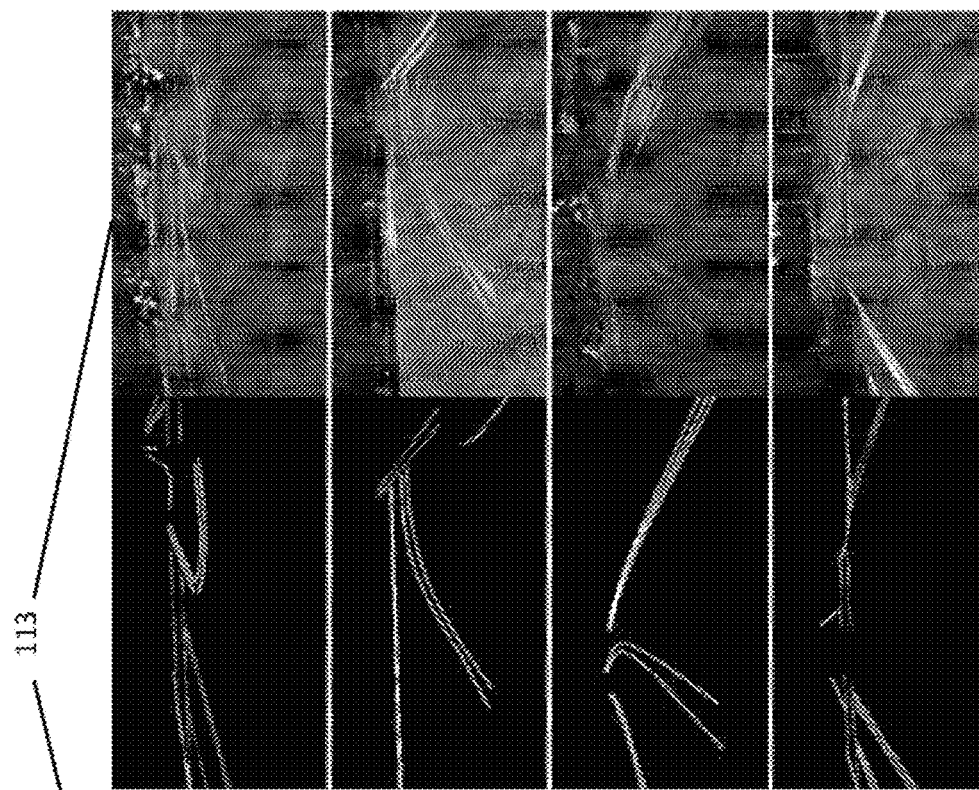
FIG. 1C shows examples of user-generated graphical representations and synthetic images generated based the user-generated graphical representations, according to an embodiment.
Figure 1C:
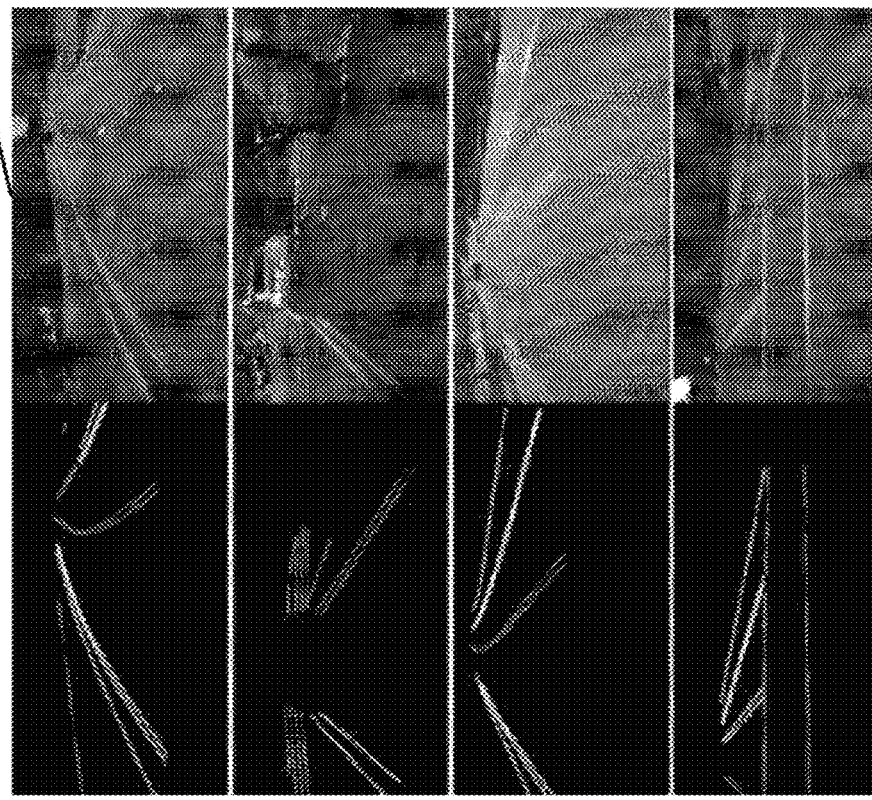

The user-generated graphical representation 108A can refer to an image generated by a user, such as a sketch on a piece of paper or drawing application (e.g., Microsoft Paint®, Microsoft PowerPoint®, Microsoft Visio® and/or the like). The user-generated graphical representation 108B shown in FIG. 1B, as well the images shown at columns 112 in FIG. 1C, are examples of a user-generated graphical representation 108A. In some implementations, the user-generated graphical representation 108A is not captured by/using a camera (besides capturing the image of the user-generated graphical representation 108A itself, if necessary, e.g., for drawings on physical paper). Thus, while the sensor detected image 107A can depict a real-life scene, the user-generated graphical representation 108A can be more abstract. In some implementations, the user-generated graphical representation 108A includes only one-dimensional shapes (e.g., lines), only two-dimensional shapes (e.g., squares, circles, rectangles), or a combination thereof. In some implementations, the user-generated graphical representation can include text (and/or any other appropriate symbol) that can indicate an associated object to be included in the synthetic image 109A (e.g., "car truck" can refer to a truck, "P" can refer to a pedestrian, a small circle labelled "Deer" can refer to a baby deer, a large circle labelled "Deer" can refer to an adult deer, etc.).

The user-generated graphical representation 108A can be input into the generative network 103 of the GAN, and the generative network 103 can output (e.g., based on competing with the discrimination network 105) the synthetic image 109A. In essence, the generative network 103 is configured to try and fool the discrimination network 105 into failing to discriminate the synthetic image 109A from the sensor detected image 107A, while the discrimination network 105 is configured to try and discriminate the synthetic image 109A from the sensor detected image 107A. The images shown at columns 113 in FIG. 1C are examples of a synthetic image 109A. The synthetic image 109A can resemble a real image/photograph, but unlike the sensor detected image 107A, the synthetic image 109A was not captured using a camera. The generative network 103 can therefore seemingly generate a transformed version of the sensor detected image 107A based on the user-generated graphical representation 108A. As such, even if the sensor detected image 107A does not depict a desirable scene for training purposes, the user-generated graphical representation 108A can be produced quickly and cheaply by a user, and used to generate a synthetic image depicting a scene that is desirable for training purposes. The synthetic image 109A can include objects not included in the sensor detected image 107A and/or include modified versions (e.g., different location and/or different shape) of objects included in the sensor detected image 107A. To a human, the GAN can seemingly manipulate the sensor detected image 107A to generate the synthetic image 109A based on the location, color, shape, pattern, and/or any other attribute of the graphical representations included in the user-generated graphical representation 108A.

The processor 101 can use the discrimination network 105 to determine if the discrimination network 105 can distinguish between the synthetic image 109A and a sensor-detected image (e.g., sensor-detected image 107A, or a different sensor-detected image) In some implementations, the processor 101 can use the discrimination network 105 to determine whether or not the synthetic image 109A is a real image (and/or not a real image). For example, the discrimination network 105 may not be able determine whether or not the synthetic image 109A is an image captured by a camera and/or an image of a real-life scene. Alternatively, the discrimination network 105 may be able to determine that the synthetic image 109A is not an image captured by a camera and/or an image of a real-life scene. In some implementations, the discrimination network 105 can determine if the synthetic image 109A has a realism that is similar to that of the sensor-detected image 107A. The discrimination network 105 failing to distinguish between the sensor detected image 107A and synthetic image 109A can indicate that the generative network 103 has generated an image (e.g., synthetic image 109A) that has a desired (predefined) amount of resemblance (e.g., realism) to the sensor detected image 107A.

As an example, it may be desirable to train a perception model (e.g., perception model 106) using images depicting ducks crossing a street. It may be difficult, however, to capture an actual image of ducks crossing a street. In such a case, a user may create a user-generated graphical representation that includes a representation of ducks (e.g., green boxes each labelled with "duck") crossing a street (e.g., between two lines indicating lane markers of a street). The generative network 103 can receive the user-generated graphical representation created by the user, the discrimination network 105 can receive a sensor detected image(s), and the generative network 103 can attempt to generate a synthetic image that the discrimination network 105 cannot distinguish from the sensor detected image(s). In some implementations, the sensor detected image may include a duck(s) (e.g., not crossing the street). In turn, the generative network 103 can generate a synthetic image showing ducks crossing the street. Thus, the synthetic image maintains a realism similar to the sensor detected image, but also incorporates objects and associated attributes (e.g., relative location, size, etc.) as specified by the user-generated graphical representation.

In some implementations, the synthetic image 109A can be input into an object detector 104, where the object detector 104 can output a non-user-generated graphical representation 110A. The non-user-generated graphical representation 110B shown in FIG. 1B is an example of a non-user-generated graphical representation 110A. The non-user-generated graphical representation 110A can resemble a sketch, similar to the user-generated graphical representation 108A, but was not generated directly by the user (e.g., not drawn by the user). The non-user-generated graphical representation 110A and the user-generated graphical representation 108A may be substantially identical (e.g., at least 90% identical, at least 95% identical, at least 98% identical, at least 99% identical, etc. and/or not distinguishable by a software model and/or objective function within a predetermined acceptable range and/or the like) or may differ (i.e., not substantially identical). In some implementations, the non-user-generated graphical representation 110A includes only one-dimensional shapes (e.g., lines), only two-dimensional shapes (e.g., squares, circles), or a combination thereof. In some implementations, the non-user-generated graphical representation 110A includes text. In some implementations, the object detector 104 may be a pretrained GAN model, and some or all weights of the pretrained GAN model can be modified to generate the GAN. Additional details related to the GAN and object detector 104 are discussed at "Wang, Sheng-Yu, David Bau, and Jun-Yan Zhu. "Sketch your own gan." *Proceedings of the IEEE/CVF International Conference on Computer Vision.* 2021.", the contents of which are incorporated by reference herein in its entirety.

An objective function (e.g., loss function, reward function, etc.) (i.e., objective function value) can be determined based on a comparison (e.g., similarity and/or difference) between the user-generated graphical representation 108A and the non-user-generated graphical representation 110A. In some implementations, the objective function is a loss function (i.e., loss function value, loss function output, etc.), and the loss function can indicate how identical/aligned the user-generated graphical representation 108A is to the non-user-generated graphical representation 110A (e.g., based on factors such as location of objects, shapes of objects, colors of objects, and/or the like), where less difference (i.e., more identical/aligned) can have less loss compared to more difference (i.e., less identical/aligned). In some implementations, the objective function is a reward function (e.g., reward function value, reward function output, etc.), and the reward function can indicate how identical/aligned the user-generated graphical representation 108A is to the non-user-generated graphical representation 110A (e.g., based on factors such as location of objects, shapes of objects, colors of objects, and/or the like), where less difference (i.e., more identical/aligned) can have more reward compared to more difference (i.e., less identical/aligned).

In some implementations, the objective function being within a predetermined acceptable range can indicate that the user-generated graphical representation 108A and non-user-generated graphical representation are substantially identical. For example, if the objective function is a loss value indicating loss less than a predetermined threshold value, the user-generated graphical representation 108A and non-user-generated graphical representation 108A can be determined to be substantially identical. As another example, if the objective function is a reward value indicating reward greater than a predetermined threshold value, the user-generated graphical representation 108A and non-user-generated graphical representation 108A can be determined to be substantially identical.

In some implementations, the perception model 106 can be updated using the synthetic image 109A in response to the user-generated graphical representation 108A and non-user-generated graphical representation being determined as substantially identical. In some implementations, the perception model 106 is used to perceive a vehicle's (e.g., vehicle 120, discussed with respect to FIG. 1D) surrounding. As such, it can be desirable that the perception model 106 is able to perceive the vehicle's surrounding quickly and accurately. By training the perception model 106 using images depicting a wide range of different scenes, which can resemble real-life scenes but be synthetically generated, the perception model 106 can analyze the vehicle's surroundings quicker and more efficiently than training the perception model 106 with only images from real-life scenes. In turn, the vehicle itself can operate in a more desirable manner (e.g., safer, smoother, more efficient, etc.).

Note that, although FIG. 1A shows a single sensor detected image 107A, a single user-generated graphical representation 108A, a single synthetic image 109A, and a single non-user-generated graphical representation 110A, in some implementations, multiple sensor detected images, multiple user-generated graphical representations, multiple synthetic images, and/or multiple non-user-generated graphical representations can be generated/used/stored. For example, multiple user-generated graphical representations can be input into the generative network 103, and/or multiple sensor detected images (e.g., one, two, three, etc.) can be input into the discrimination network 105. In turn, multiple synthetic images can be generated, where (1) the number of synthetic images can match the number of user-generated graphical representations input to the generative network 103, and (2) each synthetic image can be associated with (e.g., generated using) a unique (i.e., different) user-generated graphical representation from the multiple user-generated graphical representations.

Note that, although FIG. 1A shows a single generative network 103, a single object detector 104, a single discrimination network 105, and a single perception model 106, in some implementations, multiple generative networks, multiple object detectors, multiple discrimination networks, and/or multiple perception models can be used/stored. As such, in some implementations, multiple synthetic images and/or non-user-generated graphical representations can be generated for example in parallel using multiple sensor detected images and/or user-generated graphical representations.

Note that, although FIG. 1A shows the generative network 103, object detector 104, discrimination network 105, perception model 106, sensor detected image 107A, user-generated graphical representation 108A, synthetic image 109A, and non-user-generated graphical representation 110A in memory 102 of the synthetic image generation system 100, in some implementations, the generative network 103, object detector 104, discrimination network 105, perception model 106, sensor detected image 107A, user-generated graphical representation 108A, synthetic image 109A, and non-user-generated graphical representation 110A can be distributed across multiple different compute devices, servers, and/or systems. In some implementations, the multiple different compute devices, servers, and/or systems can be configured for wireless communication, in which case the generative network 103, object detector 104, discrimination network 105, perception model 106, sensor detected image 107A, user-generated graphical representation 108A, synthetic image 109A, non-user-generated graphical representation 110A, and/or one of more copies thereof can be stored and/or exchanged wirelessly between two or more different systems (e.g., via a network) on an as-needed basis. For example, if the synthetic image generation system 100 is a compute device remotely coupled to a fleet of one or more vehicles (e.g., fleet of one or more autonomous vehicles), sensor detected image 107A can be captured by a vehicle (e.g., vehicle 120 of FIG. 1D) and sent to the synthetic image generation system 100. As another example, if the synthetic image generation system 100 is a first compute device remotely coupled to a second compute device (e.g., different than the first compute device), a user can generate the user-generated graphical representation 108A using the second compute device, and the second compute device can send the user-generated graphical representation 108A to the first compute device/synthetic image generation system 100.

Note that, although FIG. 1A does not show a vehicle and/or fleet of vehicles, in some implementations, the synthetic image generation system 100 can be operatively coupled to the vehicle(s) (e.g., vehicle 120 of FIG. 1D; via a wireless connection over one or more networks). The vehicle(s) can be any type of vehicle, such as a motor vehicle (e.g., motorcycles, cars, trucks, buses), a watercraft (ships, boats, underwater vehicles), aircraft (e.g., airplanes, helicopters, aerostats), a spacecraft, or a combination thereof. In some implementations, the vehicle can include its own perception model (e.g., perception model 125 of FIG. 1D); as the perception model 106 is updated (e.g., retrained) using synthetic images, a representation of the (now updated) perception model 106 and/or a representation of the new updates to the (now updated) perception model 106 can be sent to the vehicle (e.g., to replace and/or update the perception model stored in the vehicle). In some implementations, the vehicle(s) and synthetic image generation system 100 are associated with (e.g., owned by, designed by, accessible by, etc.) the same organization (e.g., company).

Note that, although FIG. 1A does not show a vehicle, in some implementations, the synthetic image generation system 100 can be included in the vehicle. In some implementations, the vehicle(s) and synthetic image generation system 100 are associated with the same organization.

Note that, although FIG. 1A shows a perception model 106, in some implementations, the synthetic image 109A can be used to update any other model (that may be included in memory 102 or may be located remotely from the synthetic image generation system 100). In some implementations, the synthetic image 109A can be used to update any image/video generation and/or image/video recognition model.

FIG. 1B shows a workflow diagram for using a GAN to generate one or more synthetic images, according to an embodiment. FIG. 1B includes a sensor detected image 107B and a user-generated graphical representation 108B. The sensor detected image 107B includes three solid lane markers and a single vehicle. The user-generated graphical representation 108B includes two dashed lines (indicating two dashed lane marker), two solid lines (indicating two solid lane markers), and two rectangles (indicating two vehicles—a first vehicle located in a left lane, and a second vehicle in front of the first vehicle and located in a middle lane).

The user-generated graphical representation 108B can be input into the generative network 103. Competing with the discrimination network 105 and sensor detected image 107B, the generative network 103 can generate a synthetic image 109B. The synthetic image 109B has a realism much like the sensor detected image 107B, but includes two dashed lane markers, two solid lines, and two vehicles (the first in the left lane, and the second in front of the first and in the middle lane), coinciding with the user-generated graphical representation 108B.

The synthetic image 109B can be input/sent to the object detector 104, and the object detector 104 can output a non-user-generated graphical representation 110B. In this example, the non-user-generated graphical representation 110B is substantially identical to/aligned with the user-generated graphical representation 108B, though in other implementations, that may not be the case. An objective function can be determined based on the difference and/or similarity between the user-generated graphical representation 108B and the non-user-generated graphical representation 110B, and the objective function being within a predetermined acceptable range can cause the synthetic image 109B to be used to update/retrain a model (e.g., perception model 106).

FIG. 1C shows columns 112, 113 of images. The images at columns 112 are examples of user-generated graphical representations, and the images at columns 113 are examples of synthetic images generated based on the images at columns 112 (e.g., using generative network 103). The images at columns 112 includes lines of various colors, where each line of a given color can represent and/or correspond to a given type of road marking/characteristic, for example, a solid line, double solid lines, a dash line, and/or the like. In other words, a line(s) of a specific color in an image(s) at columns 112 can represent/indicate a specific type of line on a road in the synthetic image(s) at column 113. For the examples shown in FIG. 1C, a blue solid line, a yellow solid line, a white solid line, and a purple dashed line in the user-generated graphical representations can result in synthetic images having a shoulder, a yellow solid lane marker, a white solid lane marker, and a white cross-walk marker, respectively. The images at columns 112 have a black background, and additionally include at least three different colored lines (although two different colored lines or just a single colored line is possible). Furthermore, the images at columns 113 depict a drivable area including for example a road, a shoulder, vehicles, a solid road line(s), and a dashed road line(s). Notice that lanes in the images of columns 113 have a relative location and shape similar to that of the representations of the lanes in the images at columns 112.

FIG. 1D shows a block diagram of a vehicle 120, according to an embodiment. The vehicle 120 can include circuitry. The circuitry can include a processor 121, memory 123, sensor(s) 124, and communication interface 122, each operatively coupled to one another (e.g., via a system bus). In some implementations, the vehicle 120 is at least one of: a fully autonomous vehicle, a semi-autonomous vehicle, a semi-truck, or a heavy truck. In some implementations, the vehicle 120 is remote from, but operatively coupled to (e.g., via a network), the synthetic image generation system 100.

The processor 121 can be, for example, a hardware-based integrated circuit (IC) or any other suitable processing device configured to run and/or execute a set of instructions or code. For example, the processor 121 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 121 can be configured to run any of the methods and/or portions of methods discussed herein.

The communication interface 122 can be a hardware component of the vehicle 120 to facilitate data communication between the vehicle 120 and external devices (e.g., a network, a compute device, a different vehicle, the synthetic image generation system 100, and/or a server; not shown in FIG. 1D). The communication interface 122 can be operatively coupled to and used by the processor 121 and/or the memory 123. The communication interface 122 can be, for example, a network interface card (NIC), a Wi-Fi® module, a Bluetooth® module, an optical communication module, and/or any other suitable wired and/or wireless communication interface.

The sensor(s) 124 can include one or more sensors for collecting sensor data. The sensor(s) 124 can be used to observe and gather any information that would be useful for operating the vehicle 120, such as information associated with an external environment of the vehicle 120 and/or the vehicle 120 itself. The sensor(s) 124 can include, for example, at least one of an inertial measurement unit (IMU), camera, a radar, or a lidar. The sensor(s) 124 can collect sensor data that includes representations of attributes associated with the vehicle 120, such as the vehicle's 120 speed, location, acceleration, size, weight, etc. Additionally or alternatively, the sensor(s) 124 can collect sensor data that includes representations of attributes associated with an external environment of the vehicle 120. In some implementations, sensor data collected by the sensor(s) 112 includes real images of real-life scenes (e.g., sensor detected image 107A or 107B). Such real images can be sent to the synthetic image generation system 100 (e.g., for generating a synthetic image, updating a perception model, etc.).

The memory 123 can be, for example, a random-access memory (RAM), a memory buffer, a hard drive, a read-only memory (ROM), an erasable programmable read-only memory (EPROM), and/or the like. The memory 123 can be configured to store any data used by the processor 121 to perform the techniques discussed herein. In some instances, the memory 123 can store, for example, one or more software programs and/or code that can include instructions to cause the processor 121 to perform one or more processes, functions, and/or the like. In some embodiments, the memory 123 can include extendible storage units that can be added and used incrementally. In some implementations, the memory 123 can be a portable memory (for example, a flash drive, a portable hard disk, and/or the like) that can be operatively coupled to the processor 121.

In some implementations, the memory 123 can include a perception model 125. The perception model 125 can be used to perceive the vehicle's 120 surroundings, where determinations made using the perception model 125 can be used to determine how the vehicle 120 should be operated and/or maneuvered. The perception model 125 may be the same as perception model 106, different than perception model 106, or a combination thereof (e.g., across a period of time). In some implementations, as perception model 106 is updated (e.g., using synthetic image 109A), perception model 125 can also be updated to be identical to (the now updated) perception model 106 (e.g., via a representation of a software update sent from the synthetic image generation system 100 to the vehicle 120).

FIG. 2 shows a flowchart of a method 200 for training a perception model using a synthetic image, according to an embodiment. In some implementations, method 200 can be performed by a processor (e.g., processor 101).

At 201, a user-generated graphical representation (e.g., user-generated graphical representation 108A or 108B) is sent into a generative network (e.g., generative network 103) to generate a synthetic image (e.g., synthetic image 109A or 109B) of an area including a road. The user-generated graphical representation can include for example at least three different colors. Each color from the at least three different colors can represent a different feature from a plurality of features. For example, each color can represent a unique lane marker for or feature of the road. In some implementations, the user-generated graphical representation does not include a two-dimensional shape.

At 202, a determination is made that a discrimination network (e.g., discrimination network 105) fails to distinguish between the synthetic image and a sensor detected image (e.g., sensor detected image 107A or 107B). In some implementations, the sensor detected image is not substantially identical to the synthetic image; for example, the synthetic image may include an object that the sensor-detected image does not have, or an object in the synthetic image may have a different shape, location, and/or pattern compared to that object in the sensor-detected. The discrimination network and generative network can be part of a GAN.

At 203, the synthetic image is sent into an object detector (e.g., object detector 104) to generate a non-user-generated graphical representation (e.g., non-user-generated graphical representation 108A or 108B). In some implementations, the user-generated graphical representation is substantially identical to the non-user-generated graphical representation. In some implementations, "substantially identical" can refer to two objects (e.g., images, colors, locations, patterns, shapes, orientation, a combination thereof, etc.) differing by less than one or more of: 1%, 2%, 5%, 10%, 20%, or 25%. In some implementations, the non-user-generated graphical representation includes an identical number of colors as the user-generated graphical representation; for example, where the synthetic image is likely accurate (e.g., loss function value within a predetermined acceptable range) and a discrimination network likely cannot distinguish the synthetic image from a sensor detected image, the non-user-generated graphical representation can include N different colors if the user-generated graphical representation includes N different colors. In some implementations, where the synthetic image is likely not accurate (e.g., loss function value outside a predetermined acceptable range) and/or a discrimination network likely can distinguish the synthetic image from a sensor detected image, the user-generated graphical representation is not identical to the non-user-generated graphical representation. In some implementations, step 203 is performed automatically (e.g., without requiring human input) in response to completing step 202.

At 204, an objective function (i.e., objective function value output from a function) is determined based on a comparison between the user-generated graphical representation and the non-user-generated graphical representation. In some implementations, the objective function is a loss function, the loss function can have a higher value if the difference is greater, and the loss function can have a lower value if the difference is less. In some implementations, the objective function is a reward function, the reward function can have a higher value if the difference is lesser (i.e., similarity is greater), and the reward function can have a lower value if the difference is greater (i.e., similarity is lesser). In some implementations, step 204 is performed automatically (e.g., without requiring human input) in response to completing step 203.

At 205, a perception model (e.g., perception model 106) is trained using the synthetic image in response to determining that the objective function is within a predetermined acceptable range. For example, the perception model can identify objects and/or attributes of the synthetic image, and feedback can be fed back to the perception model (e.g., from a human, from a computer, etc.) depending on how well the objects and/or attributes were identified. In some implementations, the objective function being within the predetermined acceptable range can indicate that the user-generated graphical representation is substantially identical and/or similar enough (e.g., has a similarity greater than an acceptable predetermined threshold but may or may not be substantially identical) to the non-user-generated graphical representation.

In some implementations, upon completing step 205, an updated perception model and/or perception model patch can be generated. In some implementations, the updated perception model and/or a portion of the updated perception model (e.g., a perception model patch) can be sent to a vehicle (e.g., vehicle 120 to update a perception model 125).

In some implementations, method 200 can further comprise controlling operation of a vehicle based on the perception model. In some implementations, the vehicle can be an autonomous vehicle. In some implementations, the vehicle is one of a heavy truck, a semi-truck, or weighs at least 20,000 pounds. For relatively larger and/or heavier vehicles, accurately and/or quickly analyzing that vehicle's surroundings can be particularly desirable (e.g., to reduce risk for other vehicles on the road). Controlling operation can include, for example, sending a signal to cause the vehicle to perform a maneuver (e.g., stop, turn, accelerate, decelerate), sending a signal to cause the vehicle to refrain from performing a maneuver, sending a signal to cause a mode of the vehicle to change (e.g., turn on alarm, change from autonomous mode to manual mode, flash headlights), and/or sending a signal to cause a mode of the vehicle to refrain from being changed.

In some implementations of method 200, the synthetic image is a first synthetic image, the sensor detected image is a first sensor detected image, the user-generated graphical representation is a first user-generated graphical representation, the non-user-generated graphical representation is a first non-user-generated graphical representation, and the objective function is a first objective function. Additionally, method 200 further includes sending a second user-generated graphical representation (e.g., different than the first user-generated graphical representation) into the machine learning network to generate a second synthetic image (e.g., different than the first synthetic image). Method 200 can further include determining that the discrimination network fails to distinguish between the second synthetic image and a second sensor detected image. Method 200 can further include sending the second synthetic image into the object detector to generate a second non-user-generated graphical representation (e.g., different than the first non-user-generated graphical representation). Method 200 can further include determining a second objective function (i.e., second objective function value output from the same function as the first objective function value) based on a comparison between the second user-generated graphical representation and the second non-user-generated graphical representation. Method 200 can further include training the perception model using the second synthetic image in response to determining that the second objective function is within the predetermined acceptable range.

FIG. 3 shows a flowchart of a method 300 for generating a synthetic image, according to an embodiment. In some implementations, method 300 can be performed by a processor (e.g., processor 101).

At 301, a user-generated graphical representation (e.g., user-generated graphical representation 108A or 108B) is sent to a generative network (e.g., generative network 103) to generate a synthetic image (e.g., synthetic image 109A or 109B). The user-generated graphical representation can include a first line having a first color, a first line shape, and a first location. The synthetic image can be generated by the generation network based on the first color, the first line shape, and the first location. For example, the first color can indicate a type of object (e.g., a lane divider, a double line, etc.) to be included in the synthetic image, the first line shape can indicate a shape and/or orientation of that object (e.g., straight, curved, etc.) in the synthetic image, and the first location can indicate the relative location of the that object in the synthetic image. In some implementations, the user-generated graphical representation includes only one-dimensional shapes (e.g., lines).

At 302, a determination is made that a discrimination network (e.g., discrimination network 105) fails to distinguish between the synthetic image and a sensor detected image (e.g., sensor detected image 107A or 107B). In some implementations, the sensor detected image is not identical to the synthetic image; for example, the synthetic image may include an object that the sensor-detected image does not have, or an object in the synthetic image may have a different shape, location, and/or pattern compared to that object in the sensor-detected. The discrimination network and generative network can be part of a GAN.

At 303, the synthetic image is sent into an object detector (e.g., object detector 104) to generate a non-user-generated graphical representation (e.g., non-user-generated graphical representation 110A or 110B). The non-user-generated graphical representation can include a second line having a second color, a second line shape, and a second location. In some implementations, at least one of the second color, the second line shape, or the second location is substantially identical to the first color, the first line shape, or the first location, respectively. In some implementations, at least one of the second color, the second line shape, or the second location is different from the first color, the first line shape, or the first location, respectively. In some implementations, step 303 is performed automatically (e.g., without requiring human input) in response to completing step 302.

At 304, at least one objective function (e.g., one, two, three, etc.) is determined based on (1) a first comparison between the first color and to the second color, (2) a second comparison between the first line shape and the second line shape, and (3) a third comparison between the first location and the second location. In some implementations, where the at least one objective function is at least one loss function, (1) the first color being different from the second color can cause the at least one loss function to have a greater loss value, while first color being substantially identical to the second color can cause the at least one loss function to have a lesser loss value, (2) the first line shape being different from the second line shape can cause the at least one loss function to have a greater loss value, while first line shape being substantially identical to the second line shape can cause the at least one loss function to have a lesser loss value, and/or (3) the first location being different from the second location can cause the at least one loss function to have a greater loss value, while first location being substantially identical to the second location can cause the at least one loss function to have a lesser loss value. In some implementations, where the at least one objective function is at least one reward function, (1) the first color being different from the second color can cause the at least one reward function to have a lesser reward value, while first color being substantially identical to the second color can cause the at least one reward function to have a greater reward value, (2) the first line shape being different from the second line shape can cause the at least one reward function to have a lesser reward value, while first line shape being substantially identical to the second line shape can cause the at least one reward function to have a greater reward value, and/or (3) the first location being different from the second location can cause the at least one reward function to have a lesser reward value, while first location being substantially identical to the second location can cause the at least one reward function to have a greater reward value.

At 305, a determination is made that the user-generated graphical representation is substantially identical to the non-user-generated graphical representation based on the at least one objective function. In some implementations, the objective function being within a predetermined acceptable range (e.g., minimum reward value, maximum loss value, etc.) can indicate that the user-generated graphical representation is substantially identical and/or similar enough to the non-user-generated graphical representation.

At 306, at least one model (e.g., perception model 106) is updated using the synthetic image. In some implementations, step 306 is performed automatically (e.g., without requiring human input) in response to completing step 305.

In some implementations of method 300, the first line further has a first line pattern, the synthetic image is generated further based on the first line pattern, the second line further has a second line pattern, and the determining of the at least one objective function is further based on a fourth comparison between the first line pattern and the second line pattern.

In some implementations, method 300 further includes controlling operation of a vehicle based on the at least one model. Controlling operation can include, for example, sending a signal to cause the vehicle to perform a maneuver (e.g., stop, turn, accelerate, decelerate), sending a signal to cause the vehicle to refrain from performing a maneuver, sending a signal to cause a mode of the vehicle to change (e.g., turn on alarm, change from autonomous mode to manual mode, flash headlights), and/or sending a signal to cause a mode of the vehicle to refrain from being changed. In some implementations, the vehicle weighs at least 20,000 pounds.

FIG. 4 shows a flowchart of a method 400 for training a model using a synthetic image, according to an embodiment. In some implementations, method 400 can be performed by a processor (e.g., processor 101).

At 401, a user-generated graphical representation (e.g., user-generated graphical representation 108A or 108B) is sent into a machine learning network (e.g., generative network 103) to generate a synthetic image (e.g., synthetic image 109A or 109B). The user-generated graphical representation can include a first representation of a first object (e.g., vehicle, animal, cones, lane marking, road shoulder, building, pedestrian, bike, bus, etc.) at a first location, the first representation being a first color and a first shape.

At 402, a determination is made that a discrimination network (e.g., discrimination network 105) fails to distinguish between the synthetic image and a sensor detected image (e.g., sensor detected image 107A or 107B). In some implementations, the sensor detected image does not include the first object.

At 403, the synthetic image is input into an object detection network (e.g., object detector 104) to generate a non-user-generated graphical representation (e.g., non-user-generated graphical representation 110A or 110B). The non-user-generated graphical representation can include a second representation of a second object at a second location, the second representation being a second color and a second shape. In some implementations, the first location is substantially identical to the second location, the first color is substantially identical to the second color, and the first shape is substantially identical to the second shape. In some implementations, step 403 is performed automatically (e.g., without requiring human input) in response to completing step 402.

At 404, at least one objective function value is calculated based on (1) a first comparison between the first location and the second location, (2) a second comparison between the first color and the second color, and (3) a third comparison between the first shape and the second shape. In some implementations, step 404 is performed automatically (e.g., without requiring human input) in response to completing step 403.

At 405, a determination is made that the user-generated graphical representation is substantially identical to the non-user-generated graphical representation. In some implementations, step 405 is performed automatically (e.g., without requiring human input) in response to completing step 404. At 406, a model (e.g., perception model 106) is updated using the synthetic image.

In some implementations, method 400 can further include controlling operation of the vehicle (e.g., vehicle 120) based on the model. The controlling can include causing at least one signal to be sent to circuitry included in the vehicle. The circuitry included in the vehicle can be for example remote from the processor. Upon receiving the at least one signal, the circuitry can update a model (e.g., perception model 125) included in the vehicle. In turn, the updated model can perceive the vehicle's surrounding and cause the vehicle to perform (or refrain from performing) one or more actions (e.g., stop, turn, accelerate, decelerate, turn on alarm, change from autonomous mode to manual mode, flash headlights). In some implementations, the vehicle weighs at least 20,000 pounds and/or is an autonomous (e.g., fully autonomous, semi-autonomous) semi-truck.

In some implementations, method 400 can further include sending a model patch to a vehicle (e.g., autonomous vehicle). The vehicle can include a different model, and the model patch can be used to update that different model.

In an embodiment, a method comprises: sending, by a processor, a user-generated graphical representation into a generative network to generate a synthetic image of an area including a road, the user-generated graphical representation including at least three different colors, each color from the at least three different colors representing a feature from a plurality of features; determining, by the processor, that a discrimination network fails to distinguish between the synthetic image and a sensor detected image; sending, by the processor and in response to determining that the discrimination network fails to distinguish between the synthetic image and the sensor-detected image, the synthetic image into an object detector to generate a non-user-generated graphical representation; determining, by the processor, an objective function based on a comparison between the user-generated graphical representation and the non-user-generated graphical representation; and training, by the processor, a perception model using the synthetic image in response to determining that the objective function is within a predetermined acceptable range.

Some implementations further comprise controlling, by the processor, operation of a vehicle based on the perception model.

In some implementations, the user-generated graphical representation is substantially identical to the non-user-generated graphical representation.

In some implementations, the non-user-generated graphical representation includes an identical number of colors as the user-generated graphical representation.

In some implementations, the user-generated graphical representation includes at least four different colors, and the plurality of features includes at least four different features.

In some implementations, the user-generated graphical representation does not include a two-dimensional shape.

In some implementations, the synthetic image is a first synthetic image, the sensor detected image is a first sensor detected image, the user-generated graphical representation is a first user-generated graphical representation, the nonuser-generated graphical representation is a first non-user-generated graphical representation, and the objective function is a first objective function, the method further comprising sending, by the processor, a second user-generated graphical representation into the machine learning network to generate a second synthetic image; determining, by the processor, that the discrimination network fails to distinguish between the second synthetic image and a second sensor detected image; sending, by the processor and in response to determining that the discrimination network fails to distinguish between the second synthetic image and the second sensor detected image, the second synthetic image into the object detector to generate a second non-user-generated graphical representation; determining, by the processor, a second objective function based on a comparison between the second user-generated graphical representation and the second non-user-generated graphical representation; and training, by the processor, the perception model using the second synthetic image in response to determining that the second objective function is within the predetermined acceptable range.

In some implementations, the generative network and the discrimination network are included in a generative adversarial network.

In some implementations, the sensor-detected image is not identical to the synthetic image.

In an embodiment, an apparatus comprises: a memory and a processor operatively coupled to the memory, the processor configured to: send a user-generated graphical representation to a generative network to generate a synthetic image, the user-generated graphical representation including a first line having a first color, a first line shape, and a first location, and the synthetic image generated by the generative network based on the first color, the first line shape, and the first location; determine that a discrimination network fails to distinguish between the synthetic image and a sensor-detected image; send, in response to determining that the discrimination network fails to distinguish between the synthetic image and the sensor detected image, the synthetic image into an object detector to generate a non-user-generated graphical representation, the non-user-generated graphical representation including a second line having a second color, a second line shape, and a second location; determine at least one objective function based on (1) a first comparison between the first color and to the second color, (2) a second comparison between the first line shape and the second line shape, and (3) a third comparison between the first location and the second location; determine, based on the at least one objective function, that the user-generated graphical representation is substantially identical to the non-user-generated graphical representation; and update, in response to determining that the user-generated graphical representation is substantially identical to the non-user-generated graphical representation, at least one model using the synthetic image.

In some implementations, the user-generated graphical representation includes only one-dimensional shapes.

In some implementations, the first line further has a first line pattern, the synthetic image is generated further based on the first line pattern, the second line further has a second line pattern, and the determining of the at least one objective function is further based on a fourth comparison between the first line pattern and the second line pattern.

In some implementations, the processor is further configured to: control operation of a vehicle based on the at least one model, the vehicle weighing at least 20,000 pounds.

In some implementations, the generative network and the discrimination network are included in a generative adversarial network.

In an embodiment, a non-transitory processor-readable medium stores code representing instructions to be executed by one or more processors, the instructions comprising code to cause the one or more processors to: send a user-generated graphical representation into a generative network to generate a synthetic image, the user-generated graphical representation including a first representation of a first object at a first location, the first representation being a first color and a first shape, and the first synthetic image including the first object; determine that a discrimination network fails to distinguish between the synthetic image and a sensor-detected image, the sensor-detected image not including the first object; input the synthetic image into an object detection network to generate a non-user-generated graphical representation, the non-user-generated graphical representation including a second representation of a second object at a second location, and the second representation being a second color and a second shape; determine at least one objective function based on (1) a first comparison between the first location and the second location, (2) a second comparison between the first color and the second color, and (3) a third comparison between the first shape and the second shape; determine, based on the at least one objective function, that the user-generated graphical representation is substantially identical to the non-user-generated graphical representation; and update, in response to determining that the user-generated graphical representation is substantially identical to the non-user-generated graphical representation, a model using the synthetic image.

In some implementations, the first location is substantially identical to the second location, the first color is substantially identical to the second color, and the first shape is substantially identical to the second shape.

In some implementations, the first object is a lane marking.

In some implementations, the vehicle is at least one of an autonomous semi-truck or a semi-autonomous semi-truck.

In some implementations, the code further comprises code to cause the one or more processors to: control operation of a vehicle based on the model.

In some implementations, the controlling of the operation of the vehicle based on the model includes causing at least one signal to be sent to circuitry included in the vehicle, the circuitry included in the vehicle being remote from the one or more processors.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

What is claimed is:

1. A computer-implemented method comprising:
receiving, by a computing system, a sensor detected image not depicting a feature in a selected scenario associated with an environment for navigating a vehicle;
receiving, by the computing system, a user generated representation of the feature that is not depicted in the sensor detected image;
generating, by the computing system, a synthetic image reflecting the selected scenario including the feature that a discrimination network cannot distinguish from the sensor detected image; and
controlling, by the computing system, operation of the vehicle in the selected scenario including the feature based on a perception model trained based on the synthetic image.

2. The computer-implemented method of claim 1, wherein the feature is an object not reflected in the sensor detected image.

3. The computer-implemented method of claim 1, wherein the feature is a modified version of an object reflected in the sensor detected image.

4. The computer-implemented method of claim 1, wherein sensor detected images of the selected scenario are more difficult to obtain than sensor detected images for other scenarios.

5. The computer-implemented method of claim 1, wherein the user generated representation of the feature is a hand drawing.

6. The computer-implemented method of claim 5, wherein the hand drawing includes only at least one of one dimensional shapes and two dimensional shapes.

7. The computer-implemented method of claim 5, wherein the hand drawing includes a reference associated with an object in the hand drawing to be included in the synthetic image.

8. The computer-implemented method of claim 1, wherein a non-user generated representation is generated based on the synthetic image.

9. The computer-implemented method of claim 8, further comprising:

determining that the user generated representation is within a predetermined range of the non-user generated representation; and in response to the determining, training the perception model based on the synthetic image.

10. The computer-implemented method of claim 1, wherein the computing system implements a generative adversarial network (GAN) including a generative network for generating the synthetic image and the discrimination network for discriminating between the synthetic image and the sensor detected image.

11. The computer-implemented method of claim 1, wherein the user generated representation is not based on capture of information by a sensor.

12. A system comprising:

a processor; and a memory operably coupled to the processor, the memory storing instructions that when executed by the processor cause the system to perform operations comprising:

receiving a sensor detected image not depicting a feature in a selected scenario associated with an environment for navigating a vehicle;

receiving a user generated representation of the feature that is not depicted in the sensor detected image;

generating a synthetic image reflecting the selected scenario including the feature that a discrimination network cannot distinguish from the sensor detected image; and controlling operation of the vehicle in the selected scenario including the feature based on a perception model trained based on the synthetic image.

13. The system of claim 12, wherein the feature is an object not reflected in the sensor detected image.

14. The system of claim 12, wherein the feature is a modified version of an object reflected in the sensor detected image.

15. The system of claim 12, wherein sensor detected images of the selected scenario are more difficult to obtain than sensor detected images for other scenarios.

16. The system of claim 12, wherein the user generated representation of the feature is a hand drawing.

17. A non-transitory computer-readable storage medium including instructions that, when executed by at least one processor of a computing system, cause the computing system to perform operations comprising:

receiving a sensor detected image not depicting a feature in a selected scenario associated with an environment for navigating a vehicle;

receiving a user generated representation of the feature that is not depicted in the sensor detected image;

generating a synthetic image reflecting the selected scenario including the feature that a discrimination network cannot distinguish from the sensor detected image; and controlling operation of the vehicle in the selected scenario including the feature based on a perception model trained based on the synthetic image.

18. The non-transitory computer-readable storage medium of claim 17, wherein the feature is an object not reflected in the sensor detected image.

19. The non-transitory computer-readable storage medium of claim 17, wherein the feature is a modified version of an object reflected in the sensor detected image.

20. The non-transitory computer-readable storage medium of claim 17, wherein sensor detected images of the selected scenario are more difficult to obtain than sensor detected images for other scenarios.

* * * * *